March 30, 1954 R. P. HEUER 2,673,373
MOLDING METAL CLAD BRICK
Filed Feb. 14, 1951 2 Sheets-Sheet 1

INVENTOR
Russell Pearce Heuer
BY
ATTORNEYS

March 30, 1954  R. P. HEUER  2,673,373
MOLDING METAL CLAD BRICK
Filed Feb. 14, 1951  2 Sheets-Sheet 2
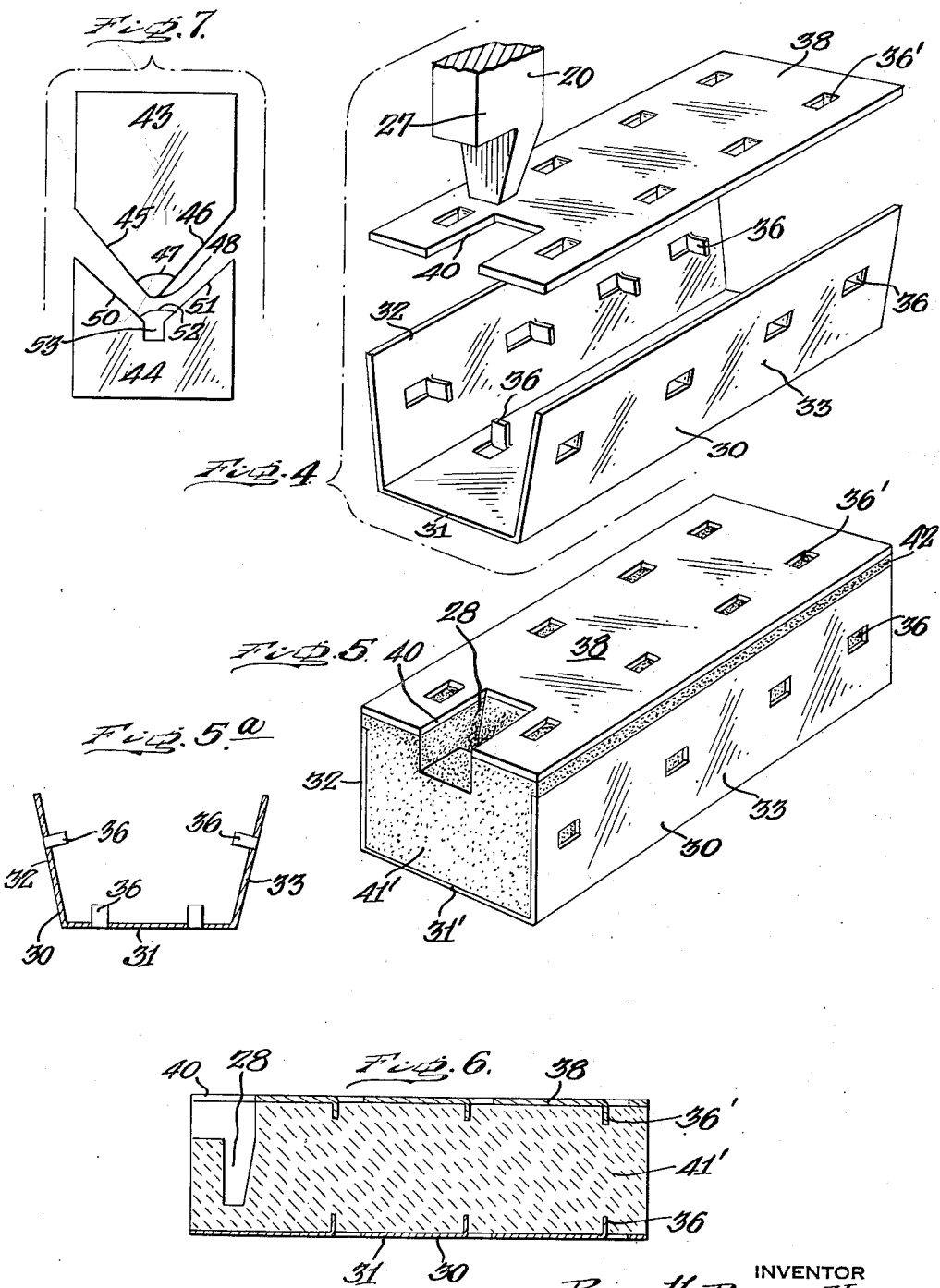
INVENTOR
Russell Pearce Heuer
BY
ATTORNEYS Patented Mar. 30, 1954

2,673,373

UNITED STATES PATENT OFFICE 2,673,373

MOLDING METAL CLAD BRICK

Russell Pearce Heuer, Villanova, Pa., assignor to General Refractories Company, a corporation of Pennsylvania Application February 14, 1951, Serial No. 210,846

4 Claims. (Cl. 18—59)

The present invention relates to metal clad non-acid refractory brick.

A purpose of the invention is to permit the co-molding of non-acid refractory brick and metal plates on the brick without the creation of crinkling, bowing, or other unintended distortion of the plates.

A further purpose is to permit comolding of non-acid refractory brick and metal plates without crinkling or bowing notwithstanding that the mold has been subjected to considerable wear.

A further purpose is to form a U-shaped spacer plate with slightly obtuse angles at the base of the U, and to force the plate into the mold and deflect the arms of the U inwardly, while sealing against the mold.

A further purpose is to shorten the base of a U-shaped metallic plate as placed in the mold so that the arms of the U adjoining the base are adjacent to but not in immediate contact with the sides of the mold.

A further purpose is to seal against intrusion of refractory between the arms of the U of the metallic plate and the mold by diverging the arms outwardly and springing them against the sides of the mold, thus permitting the arms to take up any variations in the mold dimension due to wear or otherwise.

A further purpose is to bend the U in bending dies which deliberately create divergence of the arms by springback, the angles of the operating faces of the respective dies being respectively slightly acute and slightly obtuse.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 4 is an exploded perspective of the plates and a portion of the mold, showing the elements in the position which they assume before the molding pressure is applied.

Figure 5 is a perspective of the completed metal-clad brick produced in accordance with the invention.

Figure 1:
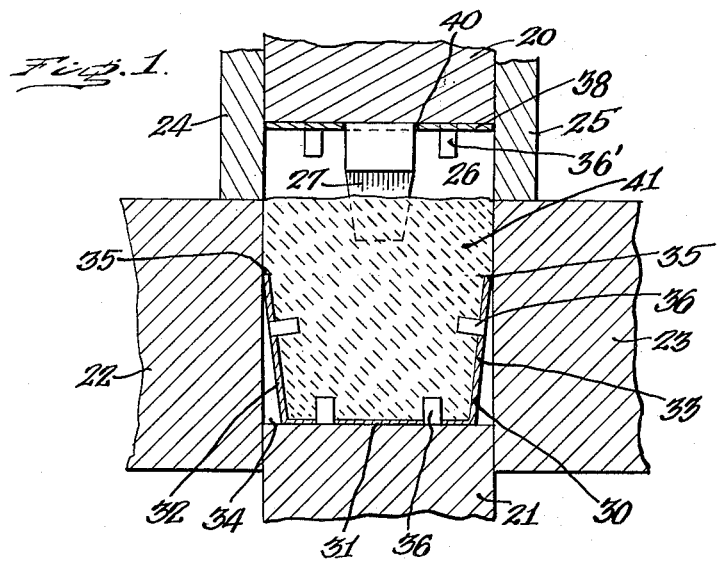
Figures 1 and 2 are diagrammatic sections of the brick-forming mold transverse to the larger dimension of the brick, Figure 1 showing the mold prior to the application of forming pressure but after the components have been introduced, and Figure 2 showing the mold after the application of forming pressure has been applied.

Figure 5ª is an end elevation of the U-shaped plate before it is placed in the mold. The obtuse angle as used in most applications is slightly exaggerated in this view.

Figure 6 is a central longitudinal section of the brick of Figure 5.

Figure 7 is an end view of the bending dies by which the corners of the U plate are bent, the dies having the same section uniformly from end to end and extending slightly longer than the length of the U-shaped plate.

In the drawings like numerals refer to like parts.

In my U. S. Patent No. 2,289,911, granted July 14, 1942, for Refractory Brick Structure, I illustrate the application of metal plates and recognize the difficulty which may be caused by virtue of crinkling, bowing, or otherwise improperly deforming the plates during the pressing operation. It will be evident that when the plates are crinkled or bowed, two adjoining bricks do not thoroughly engage one another, and the joint produced when the plates oxidize tends to be imperfect, thus restricting the advantage obtained by sealing together of adjoining bricks during use in the furnace structure. In my prior patent, I proposed to correct for the tendency to crinkle or bow the plates by weakening one face of the metallic plate so that this dimension could be adjusted. I find in practice that this corrective measure has not been infallibly successful, especially as the dimension of the mold changes substantially due to wear of the mold elements.

In accordance with the present invention, I find that difficulty through crinkling, bowing or other distortion of the plate can be substantially reduced if the base of the U is deliberately formed narrower than the corresponding face of the mold, and the arms of the U are caused to diverge so that they spring against and seal with the sides of the mold. In this way the metallic plate by the variation in the spring can make allowances for substantial differences in the mold dimension due to wear or the like. Furthermore one of the major causes of distortion of the plate has been the tendency of refractory material to intrude between the arms of the U and the mold before molding takes place. This difficulty is largely prevented by the seal obtained by the arms of the U with the sides of the mold.

Figure 2:
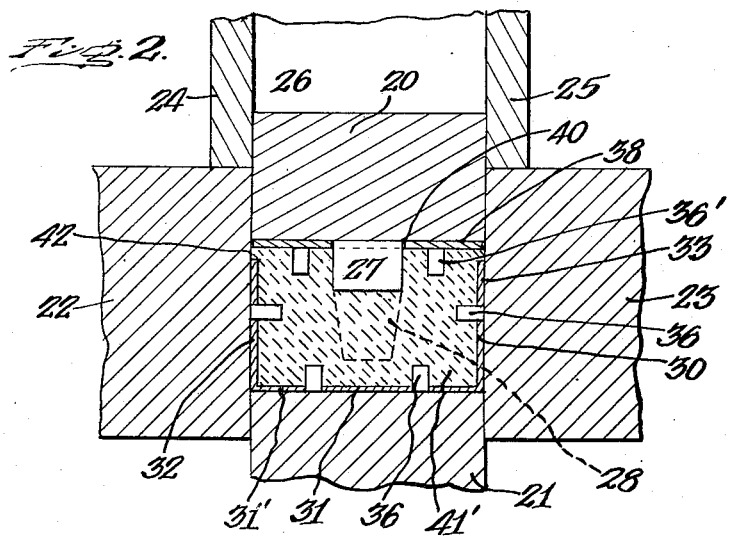

Considering first the method of molding as illustrated particularly in Figures 1, 2 and 4 the mold of any suitable character consists of relatively movable top and bottom elements 20 and 21 moved toward and away from one another by any suitable mechanism, such as a mechanical or hydraulic press. The sides of the mold are defined by suitably stationary side mold elements 22 and 23. In the present illustration the top is shown as the moving element, and this is guided by guides 24 and 25. It will be understood that the end of the mold is defined by end elements 26.

One or the other of the movable mold elements, in the present instance the upper die 20, carries a suitable nose or projection 27 which forms hanger recess 28 in the brick. It will be understood that the shape and character of the hanger recess, and the presence or absence of metallic members located adjoining the hanger recess is not critical from the standpoint of the present invention, and the hanger recess 28 is intended merely to show any suitable recess which may be formed in the brick to permit suspending the brick in a furnace roof or similar structure.

A U-shaped metallic plate 30 is placed with the base of the U on one of the relatively moving members 20 and 21, preferably the bottom die 21. This plate, and the other plate to be described, is suitably made of iron, steel, aluminum, or other suitable material as mentioned by my patent, suitably varying in thickness between 1/64 and 1/4 inch depending upon the particular application. The plate has a suitable flat base 31 of the U and suitably straight arms 32 and 33 of the U. The base and the arms are each desirably rectangular as shown.

As initially formed, the base of the U is narrower than the space between the sides 22 and 23 of the mold, so that a space 34 exists between the lateral edge or corner of the base of the U and the adjoining side of the mold permitting the plate to be placed in the mold as shown in Figure 1. This space may be of the order of 1/64 to 1/4 inch wide, varying with the particular installation.

An important feature of the invention is that the arms 32 and 33 of the U do not extend in parallel relation when the U is initially formed but diverge and their outer ends 35 seal by pressure under the spring of the metal against the sides of the mold. This seal in effect prevents the intrusion of refractory between the arms of the U and the sides of the mold.

Suitable metallic projections 36 lanced out from the base and from the arms of the U and extending inwardly are provided to embed in the refractory when the brick is formed. I find it desirable to use one row of projections on the arms and two rows on the base as shown.

Figure 3:
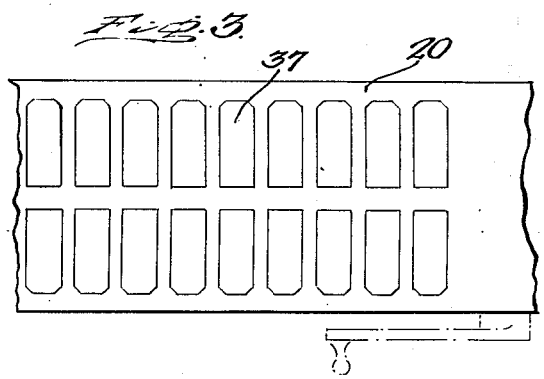
Figure 3 is a diagrammatic bottom plan view of the top molding die, showing a magnetic chuck for holding the top plate.

It is usually preferred to employ a metallic plate on the side of the brick adjoining the ends of the arms of the U, although this feature may be regarded as optional. For this purpose the top die 20 of the mold is preferably provided with a magnetic chuck 37 (Figure 3) which removably grasps a metallic plate 38 which is applied at the top of the mold. The plate 38 is preferably of the same material and thickness as the plate 30 and is normally rectangular except for a recess 40 which admits the mold projection 27 forming the hanger opening and permits access to the hanger opening. Suitable metallic projections 36' (preferably in two lines as shown) are lanced out from the top plate and extend into the refractory to be embedded therein.

After the U-shaped metallic plate is placed in the mold, suitably bottom up as shown in Figure 1, a mass of non-acid refractory particles 41 is introduced into the space inside the U-shaped plate and suitably filling the mold above the U-shaped plate. This refractory does not, however, enter the space between the arms of the U and the sides of the mold because of the sealing action of the spring arms.

The top 20 and bottom 21 of the mold are now relatively moved together and a number of different effects take place. It should be remembered that within limits the mass of refractory material 41 functions as a fluid and exerts lateral pressure as well as axial pressure against the U-shaped plate 30. The U-shaped plate is caused to stretch at the base of the U, and at the same time some of the metal of the arms of the U is forced into the base to elongate the base and adequately fill the distance between the sides of the mold. This creates a lengthened base 31' of the U which is seen in Figure 2 fully filling the space between the sides 22 and 23. At the same time the arms 32 and 33 of the U are slightly foreshortened and forced outwardly near the bottom so that the arms fully engage the sides of the mold as shown in Figure 2.

While this action just described is taking place, the top plate 38 is forced down on the top of the brick until it is closely adjoining the ends of the arms of the U, leaving only a small strip of refractory 42 near the corner between the end of the arm of the U and the plate 38.

The projections 36 and 36' from the plates extend into the refractory mass 41, and when this mass is molded into the brick 41', the plates are thoroughly held by the interlocking of the projections 36 and 36' with the refractory.

The refractory may be any suitable non-acid refractory suitably magnesia, chrome, chrome-magnesia or magnesia-chrome. When chrome is employed with iron or steel plates it is very desirable to employ some magnesia in the brick with the chrome, as this tends to give an improved bond with the plates and especially with the projections under oxidation due to the formation of magnesioferrite, which is refractory.

In operation, in molding the brick in accordance with the procedure of Figures 1 and 2, the U-shaped spacer plate having its arms in diverging condition is pushed into the mold, springing the arms slightly inwardly to seal the ends of the arms by the sides of the mold, while the base of the U engages one of the relatively moving mold elements 20 and 21, suitably the bottom of the mold. Refractory material is placed in the mold preferably inside the U and above the U. A top plate is placed on the top die 20, suitably engaged by the magnetic chuck.

The relatively moving mold elements 20 and 21 are then brought together under suitable molding pressure desirably in excess of 1,000 pounds per square inch and in most cases in excess of 5,000 pounds per square inch or preferably of 10,000 pounds per square inch.

The magnetic chuck is then suitably released, the mold parts are separated and the brick is removed from the mold. The brick is normally dried after molding, and used in a furnace lining in unfired condition.

The finished brick will suitably be of rectangular cross section as shown in Figures 5 and 6.

As already explained, it is very desirable to form the U-shaped plate with diverging arms. In order to accomplish this, the angle between the base and the arms should be greater than a right angle. This type of angle can be formed very effectively by using a male bending die 43 and a female bending die 44 as shown in Figure 7. These dies move vertically toward and away from one another in a suitable bending press. The male die 43 has operating surfaces 45 and 46 which are flat and disposed at an angle 47 which is desirably slightly less than a right angle, for example of the order of 88°. The nose 48 is slightly blunted. The cooperating operating surfaces 50 and 51 of the female die are disposed at an angle 52, which is desirably slightly greater than a right angle, for example of the order of 94°. At the apex of the angle 52 there is a suitably rectangular recess 53. The apexes of the two angles 47 and 52 are in line, and each side 45, 46, 50 and 51 is suitably straight.

Thus it will be seen that a metallic plate bent by moving the dies 43 and 44 together has an angle slightly greater than a right angle, for example between 90 and 100°, which lends itself well to the purposes of the present invention.

It will be understood that in accordance with the present invention the divergence of the arms of the U is sufficient to allow for wear which will take place in the mold, and that, regardless of the wear, there will be spring engagement of the ends of the arms of the U to seal them with the sides of the mold. Also the base of the U is made so narrow that even in a new mold before wear has taken place the space 34 will exist between the corner of the base of the U and the sides of the mold. Thus there is always a reforming action of the base of the U and the sides of the U during molding. This involves not only stretching of the base and foreshortening of the arms of the U but also bending of the metal of the plate to conform to the mold.

It will be evident that in accordance with the present invention, the tendency heretofore found to create crinkling of the plates is avoided, particularly because refractory is largely prevented from entering the space between the arms of the U and the sides of the mold.

It will be evident that differences in springback of the material of the plate can be compensated for since in any case the divergence of the arms is made adequate for the purpose even with a minimum springback.

In view of my invention and disclosure, variations and modifications to meet individual whim or particular need will doubtless become evident to others skilled in the art to obtain all or part of the benefits of my invention without copying the process and apparatus shown, and I, therefore, claim all such insofar as they fall within the reasonable spirit and scope of my claims.

Having thus described my invention what I claim as new and desire to secure by Letters Patent is:

1. The process of comolding non-acid refractory brick and U-shaped oxidizable metallic plates on certain faces of the brick in a mold having opposed relatively moveable walls and lateral walls, which comprises introducing into the mold a U-shaped oxidizable metallic plate having the base of the U extending along one of the relatively moveable walls and less wide than the spacing of the lateral walls and having arms of the U which are flexible and extend adjacent the lateral walls with the ends of the arms in contact with the lateral walls, providing a mass of refractory material in the mold inside the U, and forcing the relatively moveable mold walls together under molding pressure and thereby widening the base of the U in conformity with said one of the relatively moveable walls, forming the sides of the U into conformity with the lateral walls and molding the brick inside the U.

2. The process of comolding non-acid refractory brick and U-shaped oxidizable metallic plates on certain faces of the brick in a mold having relatively moveable top and bottom walls and lateral walls, which comprises introducing into the mold an inverted U-shaped oxidizable metallic plate having the base of the U extending over and in contact with the bottom wall and less wide than the spacing of the lateral walls, and having up-standing arms of the U which are flexible and extend adjacent the lateral walls with the ends of the arms in contact with the lateral walls, introducing a mass of refractory material into the mold inside the U, and forcing the relatively moveable top and bottom walls of the mold together under molding pressure and thereby widening the base of the U into conformity with the bottom wall, forming the sides of the U into conformity with the lateral walls and molding the brick inside the U.

3. The process of comolding non-acid refractory brick and U-shaped oxidizable metallic plates having interior projections to place the plates on certain faces of the brick, using a mold having opposed relatively moveable walls and lateral walls, which comprises introducing into the mold a U-shaped oxidizable metallic plate having the base of the U extending along one of the relatively moveable walls and less wide than the spacing of the lateral walls, having arms of the U which are flexible and extend adjacent the lateral walls with the ends of the arms in contact with the lateral walls and having projections extending inwardly from the arms, providing a mass of refractory material in the mold inside the U, and forcing the relatively moveable mold walls together under molding pressure and thereby widening the base of the U to conform with said one of the relatively moveable walls, forming the sides of the U into conformity with the lateral walls, molding the brick inside the U and imbedding the projections into the refractory material of the brick.

4. The process of comolding non-acid refractory brick and U-shaped oxidizable metallic plates having interior projections to place the plates on certain faces of the brick, using a mold having relatively moveable top and bottom walls and lateral walls, which comprises introducing into the mold an inverted U-shaped oxidizable metallic plate having the base of the U resting on the relatively moveable bottom wall and less wide than the spacing of the lateral walls, having arms of the U which are flexible but extend adjacent the lateral walls with the ends of the arms in contact with the lateral wall and having interior projections from the arms, introducing a mass of refractory material into the mold inside the U and forcing the relatively moveable top and bottom walls together under molding pressure and thereby widening the base of the U in conformity with the bottom wall, forming the sides of the U into comformity with the lateral walls molding the brick inside the U and imbedding the projections in the refractory material of the brick.

RUSSELL PEARCE HEUER.

References Cited in the file of this patent

UNITED STATES PATENTS

| Number | Name | Date |
|---|---|---|
| 1,919,816 | Wiegand | July 25, 1933 |
| 2,040,674 | Severance et al. | May 12, 1936 |
| 2,158,044 | Haller | May 9, 1939 |
| 2,247,376 | Heuer | July 1, 1941 |
| 2,367,822 | Brown | Jan. 23, 1945 |
| 2,484,656 | Sikka et al. | Oct. 11, 1949 |